Oct. 27, 1931. H. R. WEBB ET AL 1,829,694
DEVICE FOR BALANCING BODIES HAVING A RISING AND FALLING MOVEMENT
Filed June 8, 1929 2 Sheets-Sheet 1

Oct. 27, 1931.  H. R. WEBB ET AL  1,829,694
DEVICE FOR BALANCING BODIES HAVING A RISING AND FALLING MOVEMENT
Filed June 8, 1929  2 Sheets-Sheet 2
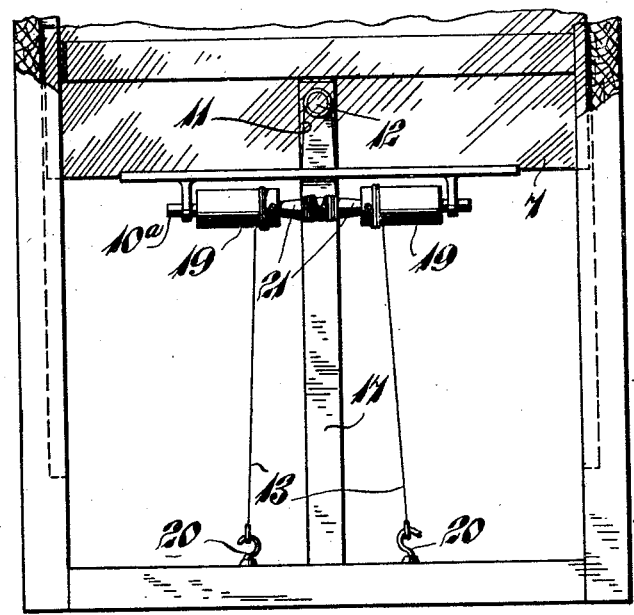
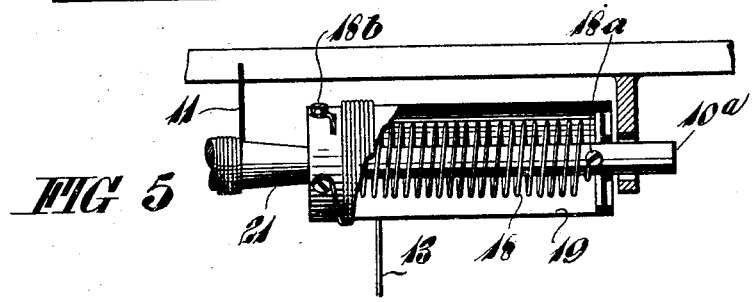
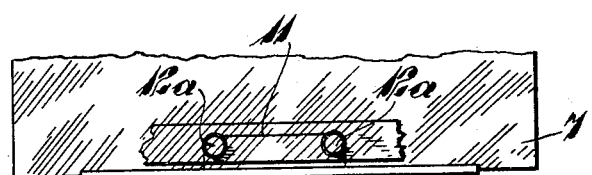
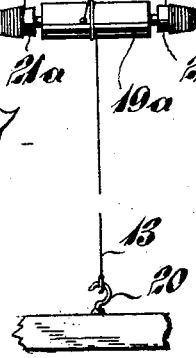

Patented Oct. 27, 1931

1,829,694

UNITED STATES PATENT OFFICE

HARRY RILEY WEBB AND HARRY NEWTON WEBB, OF GRANTHAM, ENGLAND

DEVICE FOR BALANCING BODIES HAVING A RISING AND FALLING MOVEMENT

Application filed June 8, 1929, Serial No. 369,475, and in Great Britain February 5, 1929.

This invention comprises a device for balancing bodies having a rising and falling movement, and has for its object to provide simple and efficacious means whereby a body adapted for a vertically sliding or a rising and falling motion is balanced and maintained in equilibrium at any position in its movement without the employment of balance weights, locking catches or gripping members.

According to the present invention weight balancing means are provided comprising, in combination, the body to be balanced, the weight of said body exerting a force of constant magnitude in one direction, means for exerting a second force opposed thereto, the moment of said second force varying in magnitude in accordance with the position of the body in its traverse, and compensating means functioning to maintain at all positions of the body in its traverse constant equilibrium of the opposing forces and consequently a balance of the traversable body.

Conveniently the invention embodies a rotatably mounted member, such as a roller, pulley or its equivalent, means whereby the traversable body is adapted to exert a moment tending to rotate said roller or the like in one direction, spring or elastic means exerting an opposing moment tending to rotate the roller or the like in an opposite direction, said spring exerting a force of constantly varying magnitude during the motion of the rising and falling body, and means whereby the opposing moments of force are maintained in equilibrium at all positions occupied by the traversing body in its movement.

For the purpose of more fully describing the nature of this invention reference will now be made to the accompanying drawings, wherein:—

Figure 4 is a front elevational view of a sliding window showing a modified arrangement of balancing means.

Figure 5 is an enlarged part-sectional view of part of Figure 4.

Figure 6 is a sectional end view looking from the left hand end of Figure 5.

Figure 7 is a front elevational view of a further embodiment of the invention.

In one method of carrying out the invention a vertically traversable body is connected directly or indirectly to one or more flexible inextensible cords, wires or the equivalent which is or are caused to encircle one or more rotatably mounted rollers, pulleys or the like carried by the body.

The moment of the force exerted by the weight of the body that is to be counterbalanced tends to rotate the roller or the like in one direction against the resistance of spring means which tend to effect rotation in an opposite direction, and it will be appreciated that the force exerted by said spring will vary in accordance with the position occupied by the body in its traversing movement.

Figure 1:
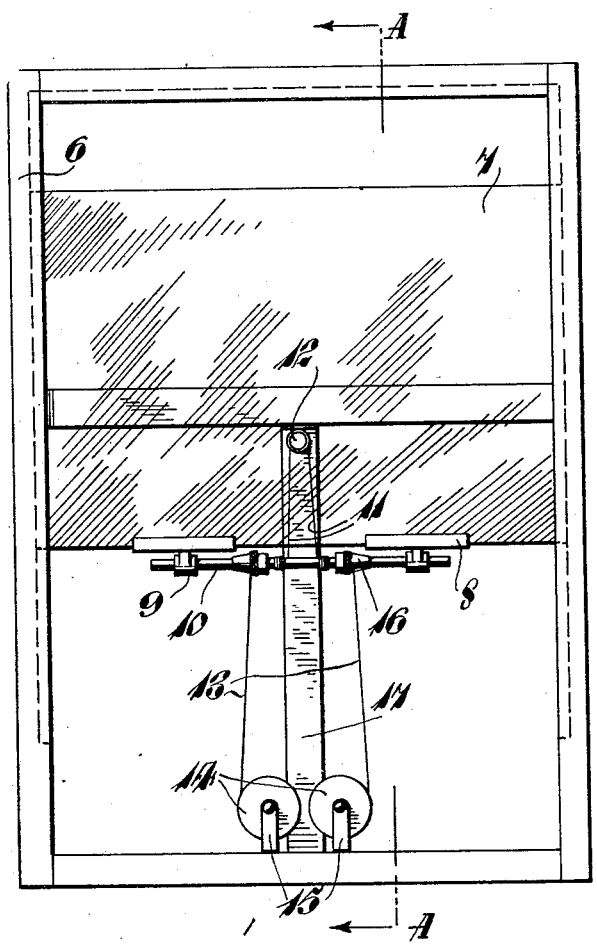
Figure 1 illustrates in front elevation a vertically sliding window with balancing means according to this invention applied thereto.
Figure 3:
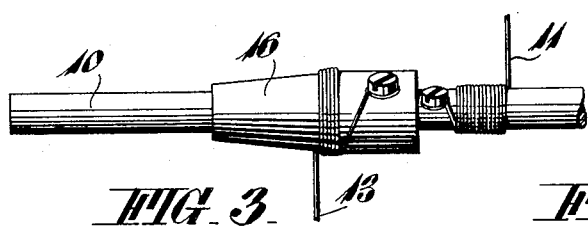
Figure 3 is an enlarged detail view of part of the arrangement shown in Figure 1.
Figure 2:
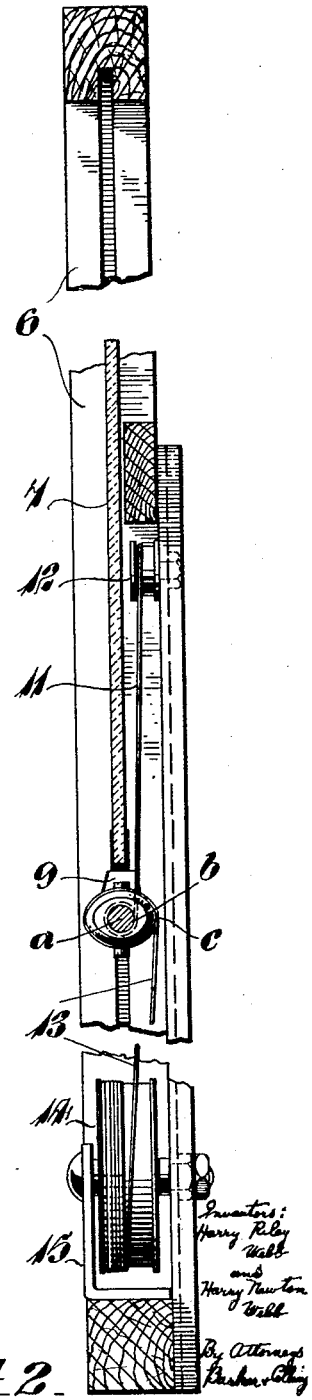
Figure 2 is an enlarged vertical section on A—A of Figure 1.

A particular embodiment of the invention as applied to a vertically sliding window suitable for use in automobiles will now be described by way of example, reference being made to Figs. 1, 2 and 3.

Within the side members of a suitably channelled frame 6 is slidably mounted a window 7 which may carry at its lower edge one or more channel members 8 having secured thereto or formed therewith lugs having sleeves or collars 9 loosely accommodating a horizontal spindle 10. This spindle 10 is suspended upon a wire or cord 11 suitably secured at its two ends to the spindle and passing upwardly over a small pulley or boss 12 fixed to the window frame or a part rigidly secured thereto at a position centrally in the width thereof.

To the said spindle 10 or parts thereon at each side of the aforesaid end connections of wire 11 is anchored the one end of each of two further wires or cords 13, each wire extending downwards over and being connected to one of a pair of rotatable drums 14 suitably mounted on fixed brackets 15 or otherwise to the window frame or a member secured thereto at or near its lowermost part.

These drums 14 are located on each side of and equally spaced from the centre of the width of the frame, and each drum contains a coiled spring of suitable strength having one end connected to the drum axle and the other to the drum itself so as to transmit rotary motion to said drum. In this way a continual tension or downward pulling effort is exerted on the downwardly extending wires 13 by the spring drums 14.

The centre of gravity of the window 7 is located directly over the axis $a$ of the spindle 10 (see Figure 2) and the point of suspension $b$ of the window by the upper wire 11 is disposed at one side of said spindle axis $a$ and removed therefrom to the extent of the radius of the spindle. In order to balance the window, the point $c$ at which the pulling effort is exerted on the spindle is disposed still further from the axis $a$ and in this way a lever action is obtained.

As the window is lowered, the spring drums 14 are rotated, the upper wire 11 becoming uncoiled from the spindle 10 and rotating said spindle in a direction to coil the lower wires 13 on to same, and during this motion the pulling effort of the springs increases. This increased pull would normally tend again to raise the window, and in order, therefore, that the varying efforts of the springs are not transmitted directly to the window, and that the latter is maintained balanced at all positions of its travel, means are provided whereby the variation in the force exerted by the springs is compensated by automatically varying the moment thereof as transmitted to the window.

One method of accomplishing this is by causing the point $c$ at which the lower wires 13 pull upon the spindle to move gradually towards or away from the axis of the spindle 10 as the pull of the springs increases or decreases, that is to say as the window is lowered or raised. This may be effected by forming or securing on the spindle 10 a tapering or part-conical member 16, the degree of taper of which is dependent upon the type and strength of spring 14, the lower wire 13 being wound on to said tapered member in such a manner that as the window is lowered and the pull of the spring is increased by a tighter coiling thereof, the wire becomes wound upon a progressively decreasing diameter of the taper and consequently the pulling point $c$ of said wire moves towards the axis of the spindle and the leverage is reduced. The formation of the tapered member is thus so arranged in relation to the strength of the spring that the window is balanced and can be displaced with equal facility at any position in the extent of its movement.

The spindle 10 with tapered parts thus constitutes a floating or freely suspended differential or compensating device, and the force of the spring is in no way retarded by acting through bearings, there being no bearings other than the members 9 which simply function as guides for the spindle and may if desired be only half round or channel shaped.

The parts carrying the upper pulley 12 and the spring drums 14 are preferably connected by one or more rigid frame members such for example as a single vertical central member 17 which may be of channel or other angular section for strength, and it is to be noted that this rigid member at every position of the window takes all the strain produced by the springs other than that necessary to balance the window.

To provide further surety that the window or the like is maintained in any desired placed position and prevented from uncontrolled movement by vibration, one or more parts of the spindle 10 and/or tapered members 16 may be so designed as to give different pulling forces at different positions in the circumference thereof, so that at one part of a revolution there is a tendency for the window to be raised while at another part of the revolution there is a tendency to lower said window. One way of accomplishing this is by forming the tapered members 16 of elliptical cross section, thus when the pulling point $c$ is at the one end of the larger diameter of the ellipse the window may move up slightly until the said pulling point $c$ coincides with the smaller diameter when the spring effort will tend to lower the window. This effect may also be produced by sections other than elliptical, such for example as approximately triangular or other polygonal or eccentric shape, or a chain member may be employed, the links of which cause the pulling forces to be exerted at differing angles upon the tapered members.

Any other suitable type of spring or elastic body may replace the spring drums 14, such for example as coiled tension springs each connected at its one end to a suitable part of the rigid frame and having a wire connected to its opposite end.

In an alternative, and the preferred arrangement, illustrated in Figs. 4, 5 and 6 the spring drums are dispensed with and in place thereof coiled springs 18 are provided which are enclosed within cylindrical members 19 and serve to connect said members to the differential or compensating spindle 10$a$, each spring being secured at its one end as at 18$a$ to the spindle and at its other end to the cylinder as at 18$b$.

In this arrangement the cylinders 19 constitute parallel portions of the differential, and to each cylinder is connected the upper end of a downwardly extending wire or cord 13, each of which is anchored at its lower end to one of a pair of hooks 20 or their equivalent fastened to the frame or other rigid stationary part.

On the spindle 10a intermediate of the spring cylinders 19 is formed or secured two tapered portions 21 which constitute the other parts of the differential, a wire or cord 11 being secured at a position between the two tapered parts 21 and extended upwardly from same over a small pulley or the like 12 mounted on the rigid member 17 or other suitable part. The last-named wire 11 constitutes the means by which the spindle 10a and window 7 are suspended as before-described.

It will be understood that the flexible connecting means, described and represented as being of wire or cord, are inextensible.

In operation, the downward motion of the window causes the suspension wire 11 to become uncoiled from the tapered parts 21 and the wire 13 coiled on to the parallel parts 19 of the spindle, and the difference in the diameters of said parts will of course effect a quicker rotation of the latter than the former. This exerts tension on the springs which tension increases or decreases in accordance with the direction of movement of the window.

In this modification the tapered parts are advantageously of elliptical cross section or other suitable non-circular section for the purpose previously set forth.

In a further embodiment of the invention (Figure 7) a single hollow cylinder 19a with enclosed spring connecting same to the spindle 10b is assembled centrally in the width of the window between two tapered portions 21a formed on or fixed to said spindle. In this arrangement a single wire 13 extends down from the cylinder to a hook or other fastening 20, and the suspension wire 11 extending up from the tapered portions 21a advantageously passes over two suitably spaced pulleys 12a or the like. The operation of this embodiment is similar to that of the last described arrangement.

It will be appreciated that apparatus employed in carrying out the invention may be modified in ways other than those previously described without departing from the scope of the invention. For example, the two tapered portions 21 (Figure 5) may in some instances be replaced by a part having a single taper, in fact one or more spring drums or cylinders and one or more taper portions or cones may be placed in various positions relatively to each other on the differential spindle so long as the tension on the wires or cords maintains said spindle at right angles to the direction of said tension.

It will be appreciated that at all times the effort of the spring or springs in excess of that required to balance the window or the like is received between the stationary points or positions at which the upper and lower flexible members 11 and 13 are connected or anchored.

While the tapering of the portions of the differential is of considerable advantage and may in some instances be found necessary for effective operation, it is to be understood that occasions may arise when same would not be required, as for instance where only the elliptical cross sectional shape of the rotatable spindle carried by the traversing body is utilized without the tapering feature.

The term "traverse," and its derivatives, is employed throughout this specification to designate, by a single word, that the body to be counterbalanced is bodily movable to and fro in a determined path.

We claim:—

1. A device for balancing bodies adapted for a rising and falling movement by means of an inconstant balancing moment, comprising a compensating spindle movable with the body to be balanced, inextensible flexible connecting means adapted to be wound onto or from said compensating spindle on movement of the body to be balanced, a stationary member to which the free end of said flexible connecting means is secured, means for applying a balancing moment to said compensating member and means whereby equilibrium is attained between the opposing moments through the range of movement of the body.

2. A device for balancing bodies adapted for a rising and falling movement by spring means the effective opposing force of which varies throughout the range of movement of the body to be balanced, comprising a compensating spindle rotatably mounted below the body and movable therewith, inextensible flexible means connecting with a relatively stationary point and wound onto or from the compensating spindle to cause rotation of the latter on movement of the body, means whereby the spring action tends to cause rotation of the spindle to lift the body, the spindle having coned portions onto which flexible connecting means may be progressively wound in order to compensate for variations in the balancing force of the spring.

3. A device for balancing bodies adapted for a rising and falling movement by means of a spring the effective force of which varies throughout the range of movement of the body to be balanced, comprising a channel member at the lower edge of the body to be balanced, supporting bearings carried by said channel member, a compensating spindle rotatably accommodated in said supporting bearings, inextensible flexible connecting means wound on said spindle and extending upwardly therefrom to a relatively stationary member, further flexible connecting means extending downwardly from the spindle and through which the spring balancing force may be applied to the differential spindle, the spindle having coned portions coacting with one of said flexible connecting means for compensating for varying spring forces, said coned portions being of elliptical section in order that equilibrium between the opposing moments may be attained at successive positions in the movement of the body.

4. A device for balancing bodies adapted for rising and falling movement comprising a compensating spindle movable with the body to be balanced, a spring-influenced drum rotatable on said compensating spindle, inextensible flexible connecting means wound onto or from said drum on movement of the body and secured to stationary members below the body, further flexible means wound onto the compensating spindle connecting with a stationary point above the body and means whereby equilibrium between the opposing moments is attained through the range of movement of the body.

5. A device for balancing bodies adapted for a rising and falling movement, comprising a compensating spindle displaceable in unison with a body to be balanced, a plurality of spring influenced drums rotatably mounted on said compensating spindle, inextensible flexible means adapted to be wound onto or from said drum on displacement of the body and connecting with a stationary point below said body and further flexible means adapted on displacement of the body to be wound onto or from progressively varying diameters on said compensating spindle and connecting with a stationary point above said spindle whereby equilibrium may be attained between the opposing moments throughout the range of movement of the body.

6. A device for balancing bodies adapted for a rising and falling movement, comprising a compensating spindle rotatably mounted below the body to be balanced and displaceable therewith, two spring influenced drums one being arranged towards each end of said spindle, inextensible flexible means wound onto or from said drums on displacement of the body to be balanced and connecting with stationary members below such body, the spindle having two coned portions arranged between said spring-influenced drums onto which further flexible members may be wound on displacement of the body, said flexible members connecting with a stationary point above said compensating mechanism, whereby equilibrium between the opposing moments may be attained throughout the range of movement of the body.

7. A device for balancing bodies adapted for a rising and falling movement comprising a rotatable compensating spindle displaceable with the body to be balanced, spring-influenced drums rotatably mounted thereon, inextensible flexible means adapted to be wound onto or from said drums on displacement of the body and connecting with stationary points below such body, further flexible means adapted to be wound onto or from coned portions of said spindle on displacement of the body and connecting to a stationary point above said spindle, said coned portions being of elliptical section whereby equilibrium between the opposing moments can be attained at successive positions throughout the range of movement of the body to be balanced.

8. A device for balancing bodies adapted for a rising and falling movement comprising a compensating spindle displaceable with the body to be balanced, two spring-influenced drums rotatably mounted on said spindle one being arranged towards each end thereof, inextensible flexible means adapted to be wound onto or from said drums on displacement of the body and connecting with stationary means below such body, further flexible means adapted on displacement of the body to be wound onto or from two coned portions disposed on said compensating spindle between said two spring-influenced drums, said coned portions being of elliptical section whereby equilibrium between the opposing moments can be attained at successive positions in the movement of the body.

9. A device for balancing a body adapted for rising and falling movement, comprising a spindle rotatively mounted and movable with the body, inextensible flexible means connected with a relatively stationary support and wound onto the spindle whereby the weight of the body tends to cause rotation of the spindle, spring mechanism connected with the spindle and tending to cause it to rotate in opposition to the rotation caused by the weight of the body, a drum-like part, carried by the spindle, and other flexible means having winding connection with the said drum-like part and also with a stationary attachment, the part of the drum-like part on which the flexible means is wound being noncircular in cross section, whereby the effectiveness of the spring to rotate the spindle is materially different during different parts of a single rotation of the said drum-like part, substantially as and for the purposes set forth.

HARRY RILEY WEBB.
HARRY NEWTON WEBB.